US008162273B2

(12) United States Patent
Jones (10) Patent No.: US 8,162,273 B2
(45) Date of Patent: Apr. 24, 2012

(54) ADJUSTABLE SUPPORT STRUCTURE (76) Inventor: Ronald Paul Jones, Bossley Park (AU)

( * ) Notice: Subject to any disclaimer, the term of this patent is extended or adjusted under 35 U.S.C. 154(b) by 67 days.

(21) Appl. No.: 12/452,125

(22) PCT Filed: Jun. 3, 2008

(86) PCT No.: PCT/AU2008/000798
§ 371 (c)(1),
(2), (4) Date: Dec. 15, 2009

(87) PCT Pub. No.: WO2008/151356
PCT Pub. Date: Dec. 18, 2008

(65) Prior Publication Data
US 2010/0133406 A1 Jun. 3, 2010

(30) Foreign Application Priority Data

Jun. 15, 2007 (AU) .................... 2007903245

(51) Int. Cl.
E06C 1/00 (2006.01)
(52) U.S. Cl. .............. 248/188.3; 182/107; 182/200; 182/202; 248/346.03; 280/47.31
(58) Field of Classification Search ........... 248/346.03, 248/148, 188.1, 188.2, 188.3, 237, 658, 676, 248/127; 280/763.1, 653, 47.31, 47.34; 182/45, 182/200, 15, 202, 107
See application file for complete search history.

(56) References Cited

U.S. PATENT DOCUMENTS

| 1,088,167 | A | * | 2/1914 | Osterhoudt | 182/200 |
| 1,127,287 | A | * | 2/1915 | Sadler | 182/200 |
| 1,542,775 | A | * | 6/1925 | Husted | 182/202 |
| 2,555,036 | A | * | 5/1951 | Husted | 182/202 |
| 2,835,427 | A | * | 5/1958 | Balcar | 182/202 |
| 2,960,182 | A | * | 11/1960 | Swanson | 182/200 |
| 2,971,602 | A | * | 2/1961 | West | 182/200 |
| 3,908,796 | A | * | 9/1975 | Hurwitz | 182/201 |
| 4,243,122 | A | * | 1/1981 | Coutts | 182/200 |

(Continued)

FOREIGN PATENT DOCUMENTS

EP 0047151 3/1982

(Continued)

OTHER PUBLICATIONS

Espacenet English Language Abstract for EP 1231356, Published Aug. 14, 2002.

(Continued)

Primary Examiner — Anita M King
(74) Attorney, Agent, or Firm — Tiajoloff and Kelly LLP (57) ABSTRACT An adjustable support device (10) for a structure, including an arcuate support bar (26) terminating in feet (28) for engagement with a ground surface. Two spaced apart locking mechanisms (30) are pivotally connected to the structure. The arcuate support bar (26) extends between engagement rods (36a, 36b) of the locking mechanisms (30). The locking mechanisms (30) are pivotally moveable between a first position, in which a stop member (38) prevents further pivotal movement in one direction such that the engagement rods (36a, 36b) are positioned to allow the arcuate support bar (26) to slide freely over the engagement rods (36a, 36b), and a second position, when weight is applied to the locking mechanisms (30). In the second position, the engagement rods (36a, 36b) lock against the arcuate support bar (26) to prevent sliding movement there through for supporting the structure in a required orientation.

19 Claims, 8 Drawing Sheets

U.S. PATENT DOCUMENTS

| | | | |
|---|---|---|---|
| 4,456,095 A | 6/1984 | Hodson | |
| 4,591,023 A | 5/1986 | Hodson | |
| 6,336,241 B1 | 1/2002 | Wilson | |
| 6,336,521 B1 | 1/2002 | Dennis | |
| 7,147,234 B2 * | 12/2006 | Davis | 280/47.31 |
| 7,354,059 B2 * | 4/2008 | Black | 280/653 |

FOREIGN PATENT DOCUMENTS

| | | |
|---|---|---|
| EP | 1231356 | 8/2002 |
| FR | 2621952 | 4/1989 |
| GB | 655493 | 7/1951 |
| JP | 2003166389 | 6/2003 |
| WO | WO 82/02416 | 7/1982 |
| WO | WO 85/03103 | 7/1985 |
| WO | WO 00/65190 | 11/2000 |

OTHER PUBLICATIONS

Espacenet English Language Abstract for FR 2621952, Published Apr. 21, 1989.

Patent Abstracts of Japan, English language abstract for JP 2003166389, Published Jun. 13, 2003.

Jershon Inc., Level-Eze Automatic Ladder Leveler, www.jershon.com, Feb. 25, 2005.

Level-Lad, The Automatic Ladder Leveller (1994).

* cited by examiner

ADJUSTABLE SUPPORT STRUCTURE

FIELD OF THE INVENTION

The present invention relates to an adjustable support device for attachment to a structure. When placed on an uneven surface, the adjustable support device may be used to adjust the level of the structure. The invention may find particular application in the levelling of ladders, seating, table tops and supporting structures such as water storage tanks and scaffolding. The invention is not limited in relation to the types of structures described in the specification and in certain embodiments and applications may also be used to orient a structure in an orientation other than level.

BACKGROUND OF THE INVENTION

Placing ladders on an uneven ground surface creates significant risks of injury to the user, whilst standing on the ladder and ascending and descending. Many injuries have been sustained as a result of falls from unstable ladders. Sloping ground, inclined surfaces, rocks and steps all contribute to the problem. It is particularly prevalent on building sites, where uneven ground and building rubble constitute the majority of the ground surface.

Uneven ground surfaces also present a problem when trying to position other items such as water storage tanks and seating, such as park benches. The uneven ground surface can result in the need for clearing of the ground before positioning the structure, or the structure is positioned unlevelled.

There have been a number of attempts to provide a levelling device for ladders. Some of these include a support arc that is connected to the bottom of the ladder via locking devices. The support arc is moveable through the locking devices to position its two feet on the ground surface, whilst allowing the ladder to remain substantially upright. However, many of these devices have a tolerance fit between the support arc and the locking device, which requires the user to manually slide the support arc through the locking device to adjust the level of the ladder. This can prove difficult when the ladder is relatively tall and heavy and in effect the ladder must be completely lifted off the ground to remove the weight to allow the components to be manually slid.

Attempts to remove manual adjustment use a spring system to urge the locking device into an unlocked position in which the support arc is free to pass through the aperture in the locking device. When weight is placed on the ladder the locking device moves into a locked position. There are a number of problems associated with these devices, as the springs lose their tension after repeated use such that the locking device does not return to the unlocked position. The support arc can become stuck in the aperture and the locking device jams in a locked position.

It is therefore an object of the present invention to provide an improved adjustable support device for attachment to a structure that at least in part alleviates some of the known problems with existing systems, or at least to provide the public with a useful choice.

Any reference in this specification to the prior art does not constitute an admission that such prior art was well know, forms part of the common general knowledge, or would be found by a person working in the field of the invention.

SUMMARY OF THE INVENTION

In one aspect, the present invention resides in an adjustable support device, including:

a frame for attachment to a structure to be levelled;
an arcuate support bar terminating in feet for engagement with a ground surface;
two spaced apart locking mechanisms connecting the frame to the arcuate support bar, each locking mechanisms including two spaced apart brackets positioned on either side of the arcuate support bar to prevent angular movement of the support bar, a stop member and spaced apart upper and lower engagement rods extending between the brackets whereby the arcuate support bar extends between the engagement rods;
wherein the locking mechanisms are pivotally connected to the frame and pivotally moveable between a first position, in which the stop member prevents further pivotal movement in one direction such that the engagement rods are positioned to allow the arcuate support bar to slide freely over the engagement rods to locate the feet in engagement with the ground surface, and a second position, when weight is applied to the frame, in which the engagement rods lock against the arcuate support bar to prevent sliding movement there through for supporting the structure in a levelled orientation.

In one embodiment, the stop member is a rod extending between the brackets.

The frame may include a normally relatively horizontal surface and two depending arms extending to the locking mechanisms. The pivotal connection of the locking mechanisms is preferably from the ends of the arms to the brackets.

The pivotal connection may be located below the upper engagement rod. The brackets may be shaped substantially like a parallelogram, having four sides and four corners. In one embodiment, the upper and lower engagement rods are located at adjacent upper and lower corners respectively, the stop member is located at the other upper corner and the pivotal connection is located at the other lower corner. The depending arms therefore extend between the brackets to the lower corner where the pivotal connection is located. The stop member thus abuts against the depending arm to limit the pivotal movement of the locking mechanism.

In one embodiment, the frame includes attachment means on the relatively horizontal surface to permanently or removably attach the adjustable support device to a structure. The structure may be a ladder, a bench, a seat, a wheelbarrow or any other suitable structure.

The feet may be connected to the ends of the arcuate support bar by universal joints. However, the feet may just be the ends of the arcuate support bar.

In another aspect, the present invention resides in an adjustable support device, including:

a frame for attachment to a structure to be levelled;
an arcuate support bar terminating in feet for engagement with a ground surface;
two spaced apart locking mechanisms connecting the frame to the arcuate support bar, each locking mechanism including two spaced apart brackets positioned on either side of the arcuate support bar to prevent angular movement of the support bar, a stop member and spaced apart upper and lower engagement members extending between the bracket whereby the arcuate support bar extends between the engagement members;
wherein the locking mechanisms are pivotally connected to the frame and pivotally moveable between a first position, in which the stop member prevents further pivotal movement in one direction such that the engagement members are positioned to allow the arcuate support bar to slide freely over the engagement members to locate the feet in engagement with the ground surface, and a second position, when weight is applied to the frame, in which the engagement members lock against the arcuate support bar to prevent sliding movement there through for supporting the structure in a levelled orientation; and wherein in the first position, the pivotal connection of the locking mechanisms to the frame is above the horizontal level of the lower engagement member and in the second position, the pivotal connection is substantially horizontally aligned with or below the lower engagement member.

In one embodiment, the engagement members comprise rods extending between the brackets.

In another embodiment, the upper and lower engagement members and the pivotal connection of the brackets to the frame member define the apexes of a triangle. In this embodiment, the triangle so defined may be an isosceles triangle with equal side lengths from the upper engagement member to the lower engagement member and from the upper engagement member to the pivotal connection.

In another aspect, the present invention resides in a wheelbarrow, including:
  a chassis including a front wheel and supporting a barrow;
  an arcuate support bar terminating in feet for engagement with a ground surface;
  two spaced apart locking mechanisms connecting the frame or barrow to the arcuate support bar, each locking mechanism including upper and lower engagement members on upper and lower sides of the arcuate support bar, whereby the arcuate support bar extends between the engagement members;
  wherein the locking mechanisms are pivotally mounted and pivotally moveable between a first position, such that the engagement members are positioned to allow the arcuate support bar to slide freely over the engagement members, and a second position, when weight is applied to locking mechanisms through their connection to the frame or barrow, in which the engagement members lock against the arcuate support bar to prevent sliding movement there through for supporting the wheelbarrow in a levelled or a tilted orientation.

In one embodiment, each locking mechanism includes a stop member, which maintains the locking mechanism in the first position when the frame is lifted away from the arcuate support bar.

In one embodiment, the feet are substantially semi-spherical in shape.

In one embodiment, in the first position, the pivotal mounting of the locking mechanisms is above the horizontal level of the lower engagement member and in the second position, the pivotal connection is substantially horizontally aligned with or below the lower engagement member.

Further aspects of the invention and further embodiments of the aspects described in the preceding paragraphs will become apparent from the following description.

BRIEF DESCRIPTION OF THE DRAWINGS

The invention will now be described, by way of example only, with reference to the accompanying drawings, in which.

DETAILED DESCRIPTION OF THE EMBODIMENTS

Figure 6:
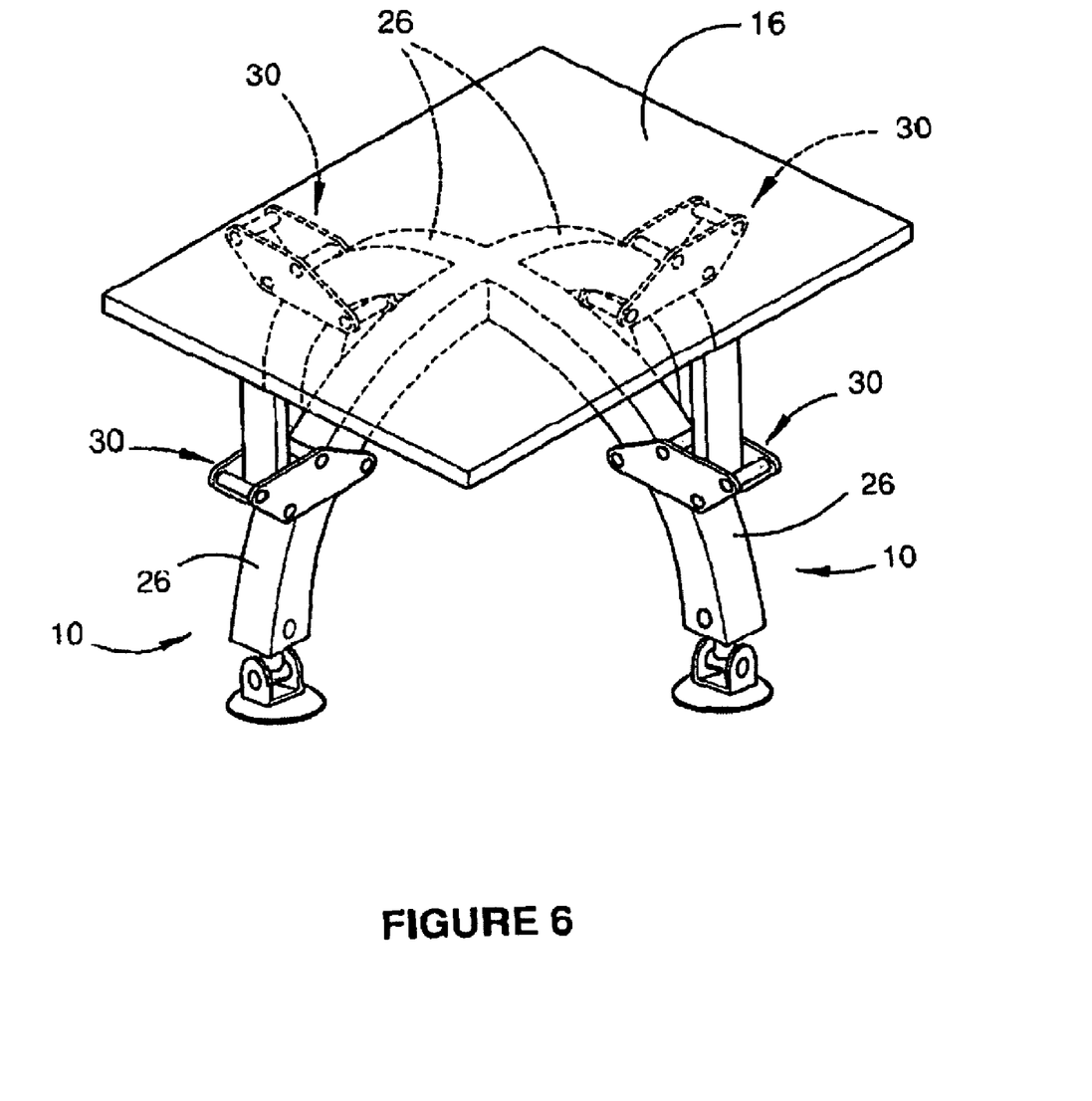
FIG. 6 is a perspective view of two adjustable support devices attached perpendicularly to a table top according to an embodiment of the invention.
Figure 7:
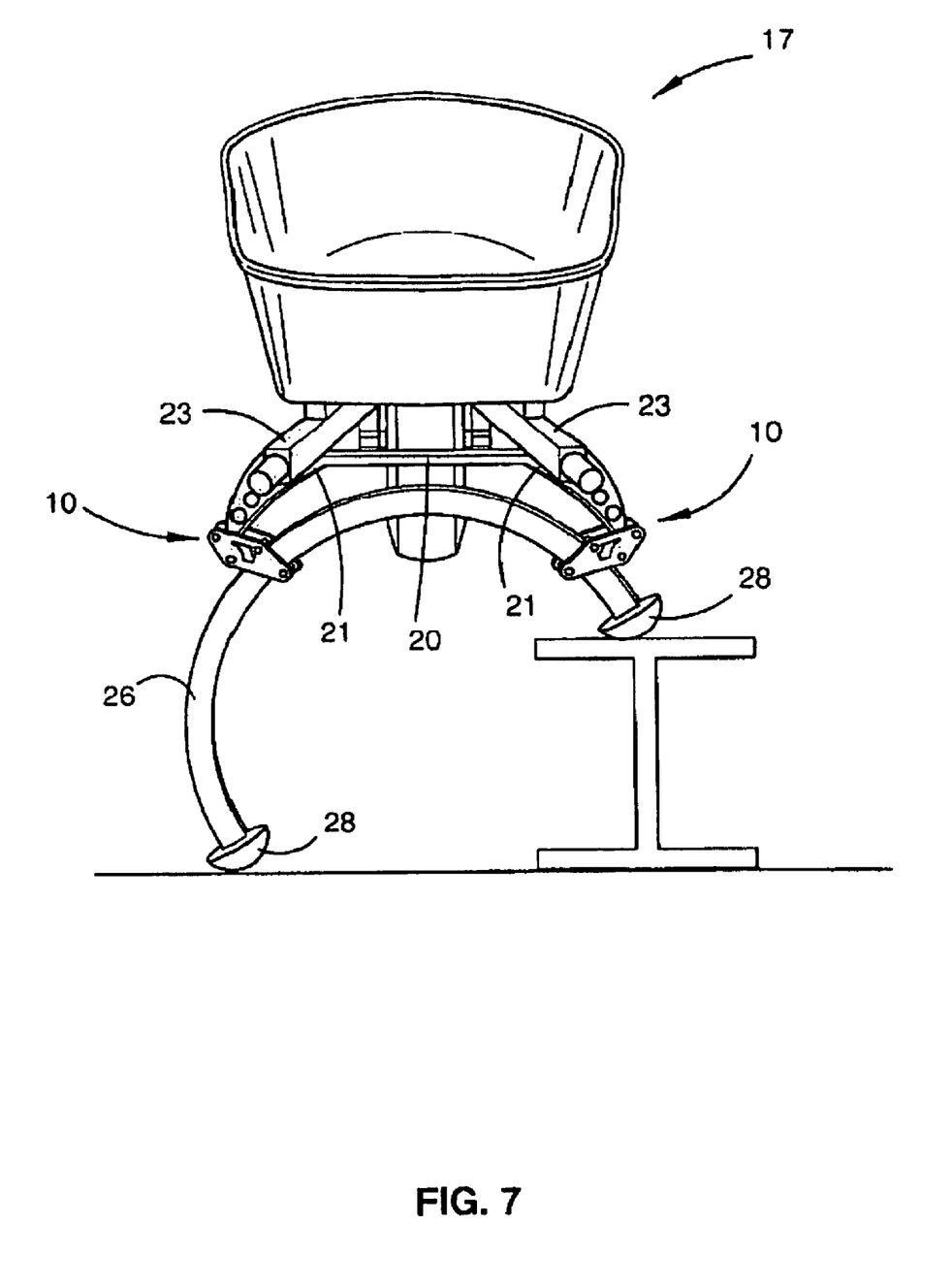
FIG. 7 is a perspective view of the adjustable support devices attached to a wheelbarrow levelled on an uneven ground surface, according to an embodiment of the invention.

As can be seen from the Figures, when placed on an uneven surface, an adjustable support device 10 can be used to adjust the orientation of a structure, such as a ladder 12 (FIG. 4), a bench top 14 (FIG. 5) or a wheelbarrow (FIG. 7). It will be appreciated that an adjustable support device 10 according to the present invention may be attached to any other suitable structures, such as a water tank or scaffolding, to level the structure. In an alternative embodiment, shown in FIG. 6, two adjustable support devices 10 can be attached perpendicularly to a table top 16 and the angle of the table top can be set at any angle required.

The adjustable support device 10 includes a frame 20 for attachment to, or forming a part of a structure to be levelled. The frame includes normally relatively horizontal surface 22 and two depending arms 24. An arcuate support bar 26 terminates in feet 28 for engagement with a ground surface, the feet 28 in the embodiment shown in FIG. 1 simply consisting of the ends of the arcuate support bar 26. Two spaced apart locking mechanisms 30 connect the frame 20 to the arcuate support bar 26 via a pivotal connection 32 at the end of the depending arms 24. A function of the frame 20 is to support the locking mechanisms 30 in their respective positions.

Figure 3:
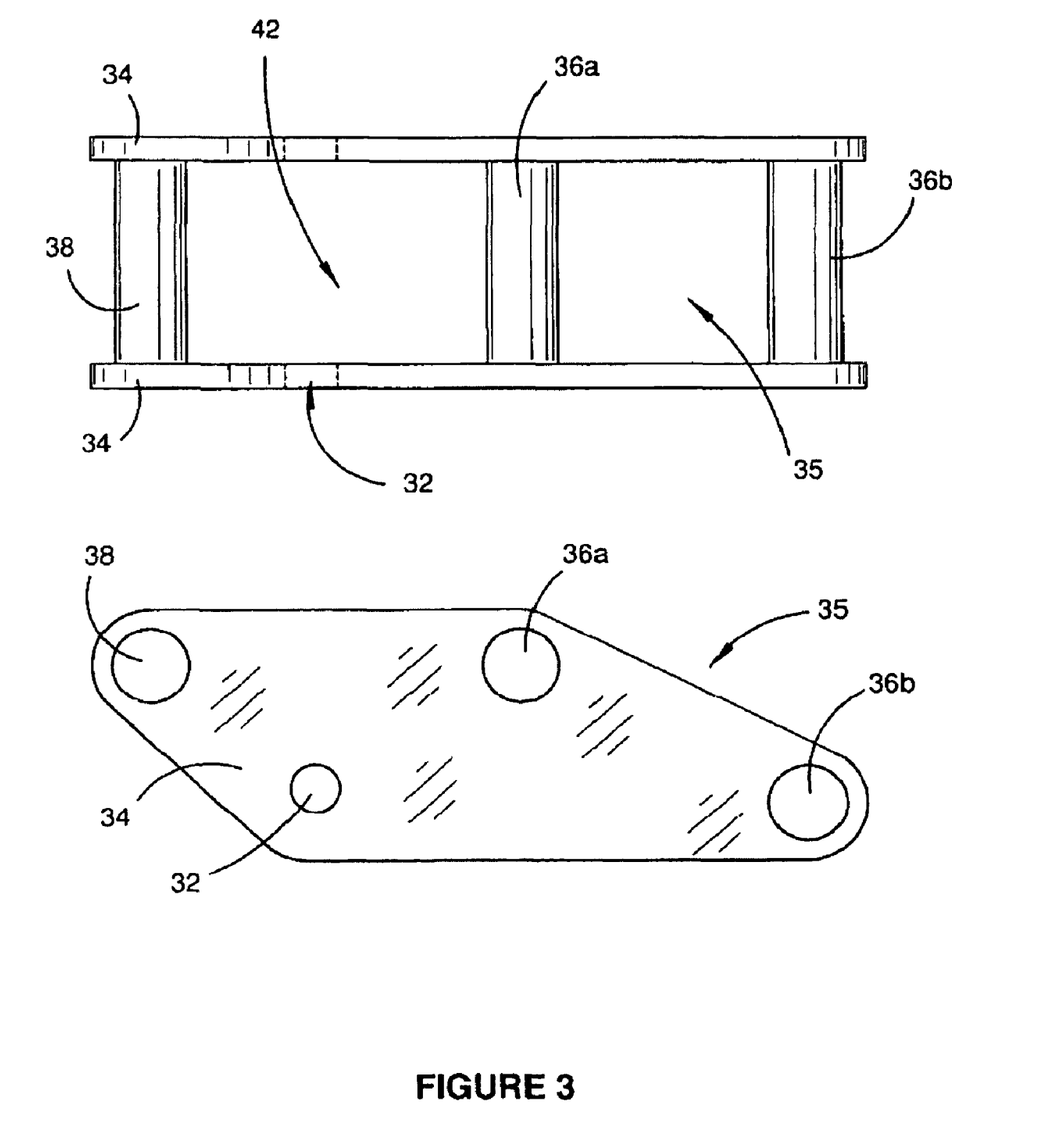
FIG. 3 is a side and top view of the locking mechanism brackets, engagement rods and stop member.

Each locking mechanism 30 includes two spaced apart brackets 34 and spaced apart upper and lower engagement members, which are rods 36a, 36b and which, in this embodiment, extend between the brackets 34 as best shown in FIG. 3. The arcuate support bar 26 extends between the engagement rods 36a and 36b through a space 35 (see FIG. 3 in particular) and angular movement of the arcuate support bar 26 is prevented by the brackets 34.

Figure 1:
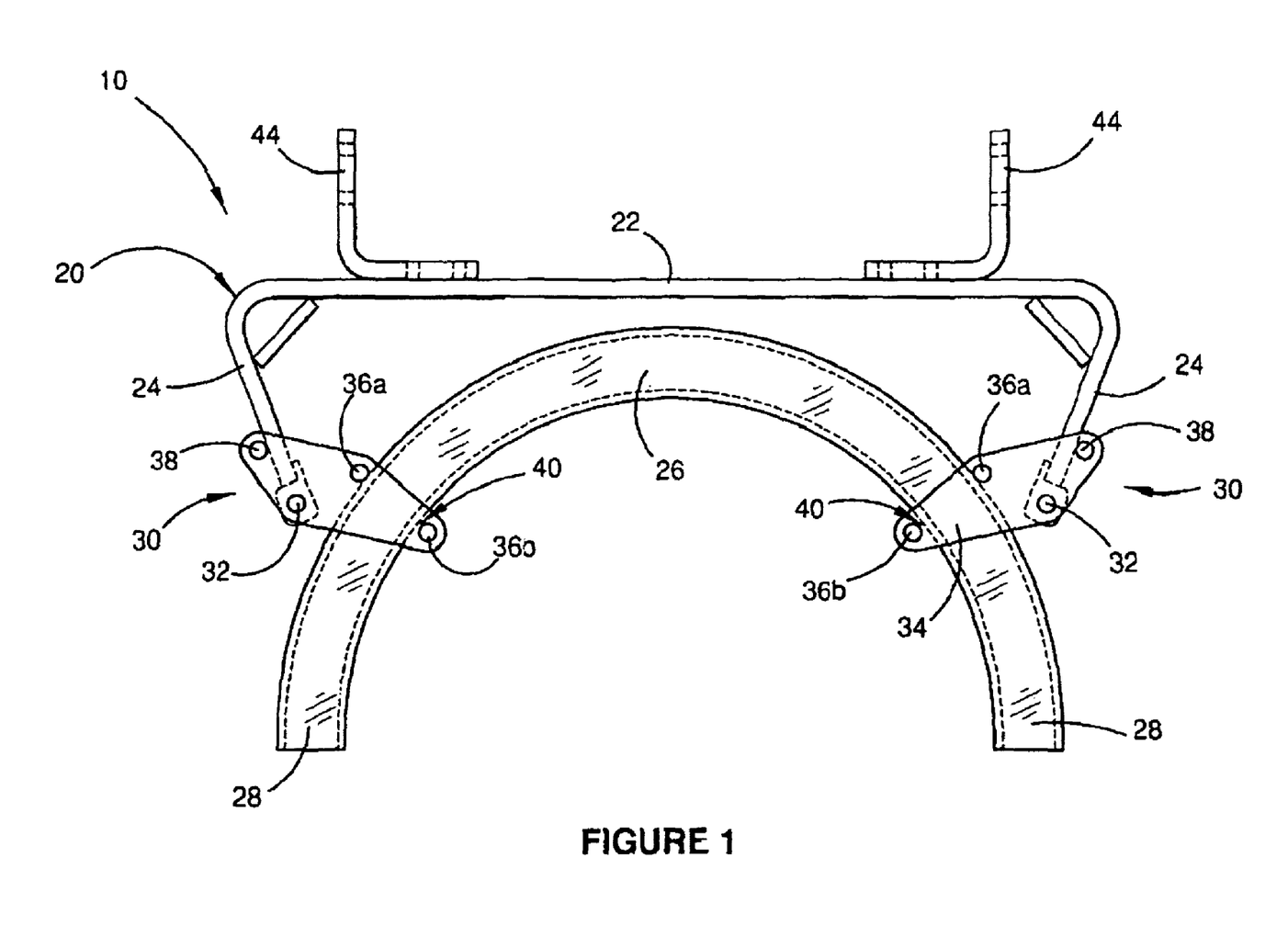
FIG. 1 is a side view of an adjustable support device according to the present invention with locking mechanisms in a first position.
Figure 2:
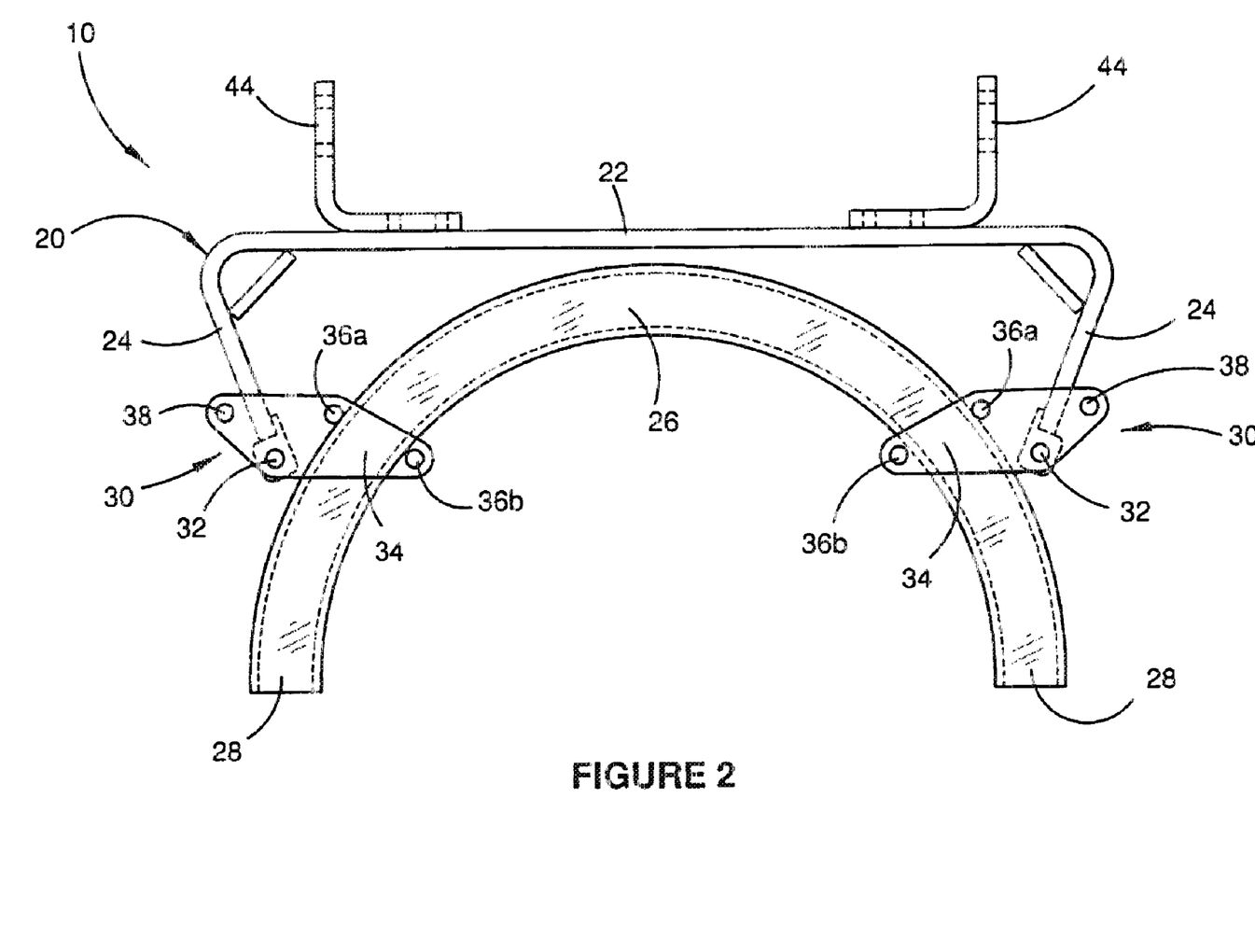
FIG. 2 is a side view of the adjustable support device of FIG. 1, with the locking mechanisms in a second position.

The pivotal connection 32 allows the locking mechanisms 30 to move between a first position, as shown in FIG. 1, and a second position, as shown in FIG. 2. In the first position, a stop member 38 prevents further pivotal movement in one direction by abutting against the depending arm 24. The stop member 38 is a rod extending between the brackets, similar to the engagement rods 36a and 36b, as shown in FIG. 3. When the stop member 38 abuts against the arm 24, the engagement rods 36a and 36b are positioned to allow the arcuate support bar 26 to slide freely over the engagement rods 36a and 36b to locate the feet 28 in engagement with the ground surface. The combination of the gap 40 created between the arcuate support bar 26 and the engagement rods 36a and 36b and the size and shape of the engagement rods 36a and 36b allows the arcuate support bar 26 to freely slide until downward pressure is applied to the brackets 34 through the depending arms 24.

In use, downward force (which may be due to the weight of the supported structure) is applied after the arcuate support bar has been positioned with both feet 28 on the ground and with the frame 20 positioned in its desired orientation. This moves the locking mechanisms 30 into the second position. In the second position, the locking mechanisms 30 have pivoted, moving the stop member 38 away from the depending arms 24 until the engagement rods 36a and 36b contact the arcuate support bar 26. In this position the engagement rods prevent sliding movement of the arcuate support bar 26 there through.

In the embodiment shown in the Figures, the brackets 34 are shaped substantially like parallelograms, such that it has four sides and four corners, however the angles of two of the sides are not necessarily parallel. The upper engagement rod 36a is located near one of the upper corners of the bracket 34, with the lower engagement rod 36b located near the lower corner on the same side of the bracket 34. When viewed from above, as in FIG. 3, the engagement rods 36a, 36b are spaced apart from each other with lower engagement rod 36b at the end. The stop member 38 is located near the other upper corner of the bracket 34, which, when viewed from above, is furthest away from the lower engagement rod 36b. The pivotal connection 32 is located in the other lower corner of the bracket, below the upper engagement rod 36a and the stop member 38. The depending arm 24 therefore extends between the brackets in the gap 42 (shown in FIG. 3) to the pivotal connection 32. The stop member 38 thus abuts against the depending arm 24 when in the first position.

As seen in FIG. 1, when in the first position, the pivotal connection 32 of the locking mechanisms is above the horizontal level of the lower engagement member 36b and in the second position, as shown in FIG. 2, the pivotal connection 32 is substantially horizontally aligned with or below the lower engagement member 36b.

The positioning of the pivotal connection 32 below the upper engagement rod 36a means that when weight is applied to the support device 10, the force is applied through the depending arms 24 to the pivotal connection 32, which pushes the lower corner of the bracket 34 downwards, resulting in a direct positive upward force by the lower engagement rod 36b against the inside curve of the arcuate support bar 26 and a positive downward force by the upper engagement rod 36a against the outside curve of the arcuate support bar 26.

To release and adjust the position of the support device, weight is removed, allowing the locking mechanisms to naturally pivot back into the first position. As the engagement rods 36a and 36b are rounded they easily disengage from the arcuate support bar 26 and sliding movement is effected freely.

Figure 4:
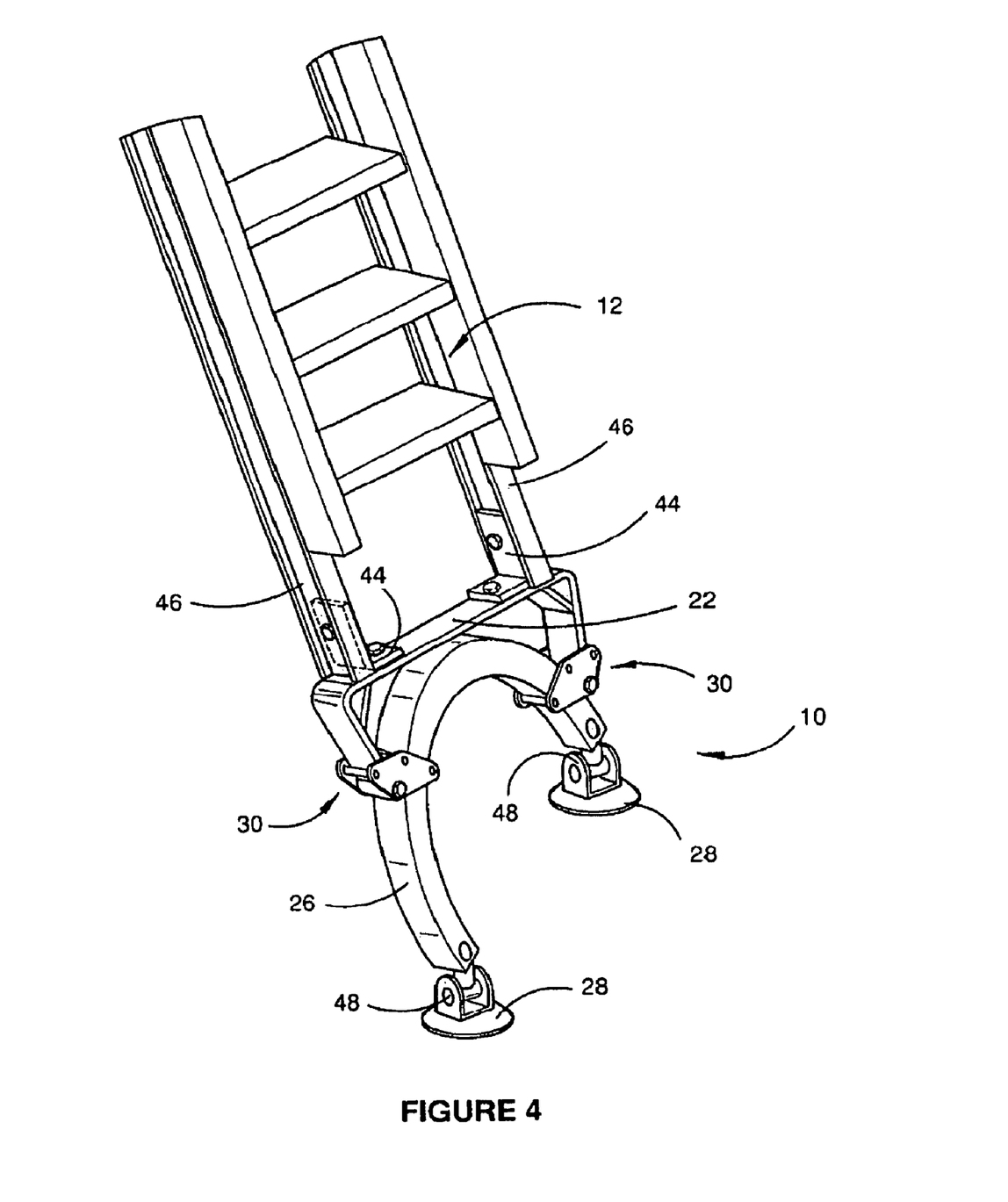
FIG. 4 is a perspective view of the adjustable support device attached to a ladder, according to an embodiment of the invention.
Figure 5:
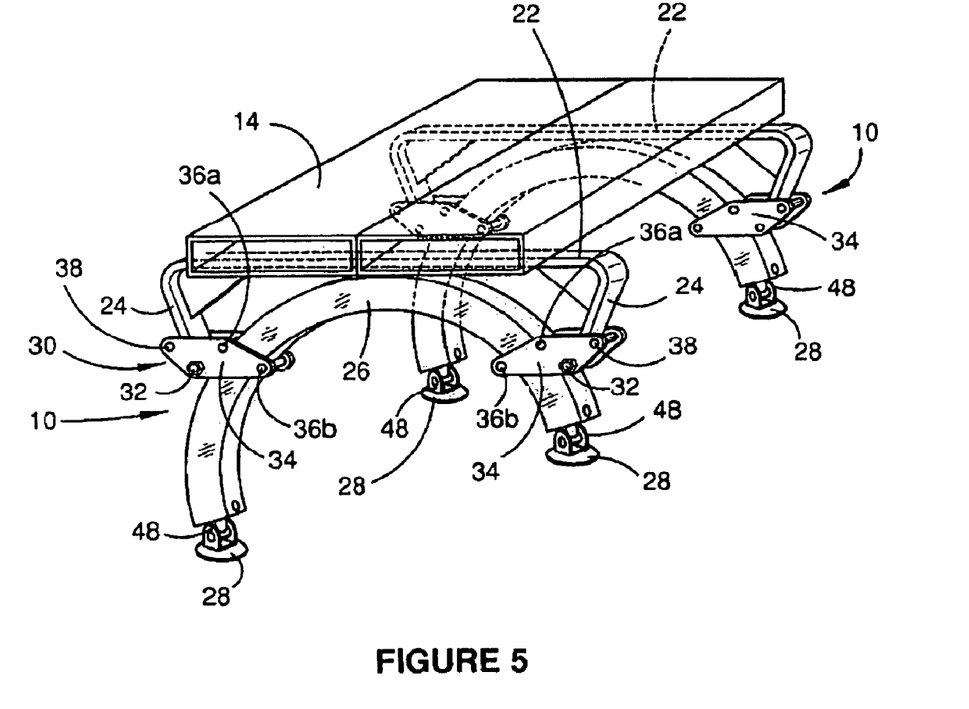
FIG. 5 is a perspective view of two adjustable support devices attached in parallel to a bench, according to an embodiment of the invention.

As can be seen in FIGS. 1, 2 and 4, the horizontal surface 22 of the frame 20 can include attachment means, such as brackets 44 to permanently or removably attach the adjustable support device 10 to a structure, such as a ladder 12. As best seen in FIG. 4, the brackets 44 may be moved along the width of the horizontal surface 22 to be positioned in alignment with the legs 46 of the ladder 12 and can then be bolted thereto. Alternatively, as shown in FIG. 5, the horizontal surface 22 can be attached directly to the structure, such as bench top 14. Two support devices 10 can be used in parallel to support a longer structure. As seen in FIGS. 4 and 5, the feet 28 can instead of being integral with the arcuate support bar 26, can be separate components, connected for example to the ends of the arcuate support bar 26 by universal joints 48.

In the embodiment illustrated in FIG. 6, two adjustable support devices 10 can be attached at right angles to each other, in a crossed over position. The two support devices 10 may either physically intersect, as shown in FIG. 6, or one may cross above the other. When the support devices 10 are attached at right angles to each other, the structure, such as table top 16, can be positioned at any angle required, rather than level. To level the table top 16, however, the legs of the support devices 10 must be in the same plane.

Figure 8:
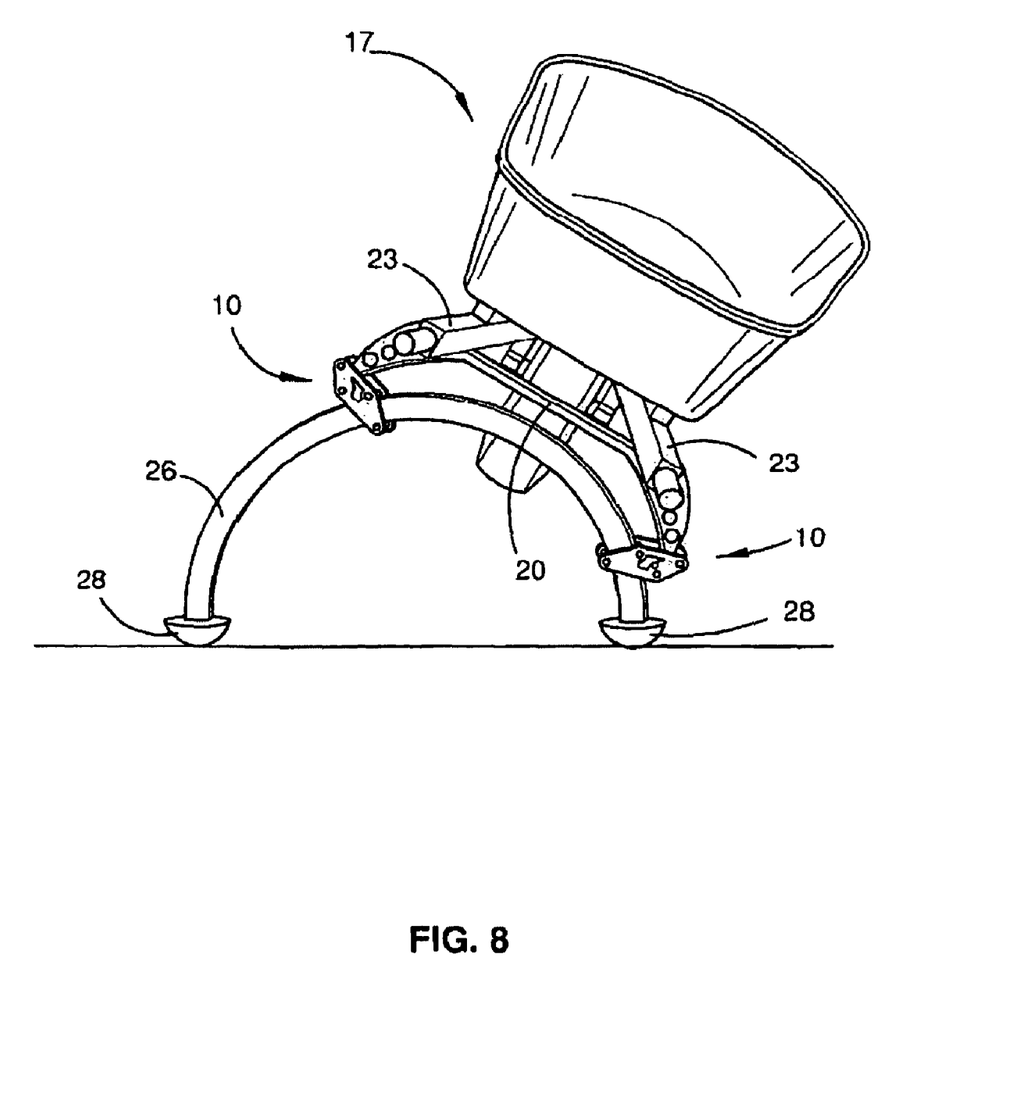
FIG. 8 is a perspective view of the adjustable support devices attached to a tilted wheelbarrow placed on an level surface, according to an embodiment of the invention.

In the embodiment illustrated in FIGS. 7 and 8, a support device 10 can be attached to a wheelbarrow 17. In this embodiment the frame 20 is attached to arms 23 of the wheelbarrow 17 at locations 21. The frame 20 may instead be mounted to the barrow of the wheelbarrow 17, where the barrow is sufficiently strong. Also shown in the figures is an alternative embodiment of the feet 28 of the arcuate support bar 26. In this embodiment the feet 28 are of semi-spherical shape and therefore adapted to engage with the ground surface at different angles without the use of a universal joint. The support device 10 can be adjusted to level the wheelbarrow 17 as shown in FIG. 7 or allow the wheelbarrow 17 to be tilted to the side if desired, for example to make hand removal of its contents easier, as illustrated in FIG. 8.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An adjustable support device for a structure, the device comprising:
an arcuate support bar terminating feet configured to engage with a ground surface;
two spaced apart locking mechanisms pivotally connected to the structure and connecting the structure to the arcuate support bar, each locking mechanism including two spaced apart brackets positioned on opposite sides of the arcuate support bar so as to prevent angular movement of the support bar, a stop member and spaced apart upper and lower engagement rods extending between the brackets such that the arcuate support bar extends between the engagement rods;
wherein the locking mechanisms are pivotally moveable between a first position, in which the stop member prevents further pivotal movement in one direction such that the engagement rods are positioned so as to allow the arcuate support bar to slide freely over the engagement rods, and a second position, when weight is applied to the locking mechanisms, in which the engagement rods lock against the arcuate support bar so as to prevent sliding movement therethrough so as to support the structure in a required orientation; and
wherein the stop member is a rod extending between the brackets.

2. The adjustable support device of claim 1 wherein the brackets are shaped substantially like a parallelogram, having four sides and four corners.

3. The adjustable support device of claim 1 wherein the structure is a ladder, a bench or a seat.

4. The adjustable support device of claim 1 wherein the feet are connected to the ends of the arcuate support bar by universal joints.

5. The adjustable support device of claim 1 wherein the feet are ends of the arcuate support bar.

6. An adjustable support device for a structure, the device comprising:
an arcuate support bar terminating in feet configured to engage with a ground surface;
two spaced apart locking mechanisms pivotally connected to the structure and connecting the structure to the arcuate support bar, each locking mechanism including two spaced apart brackets positioned on opposite sides of the arcuate support bar so as to prevent angular movement of the support bar, a stop member and spaced apart upper and lower engagement rods extending between the brackets such that the arcuate support bar extends between the engagement rods;

wherein the locking mechanisms are pivotally moveable between a first position, in which the stop member prevents further pivotal movement in one direction such that the engagement rods are positioned so as to allow the arcuate support bar to slide freely over the engagement rods, and a second position, when weight is applied to the locking mechanisms, in which the engagement rods lock against the arcuate support bar so as to prevent siding movement therethrough so as to support the structure in a required orientation; and wherein the locking mechanisms are each connected to the structure via an arm extending between the structure and the locking mechanisms.

7. The adjustable support device of claim 6 wherein the arms extend from a cross-member that is connected to the structure.

8. The adjustable support device of claim 7 wherein the cross member includes attachment means on the relatively horizontal surface to permanently or removably attach the adjustable support device to the structure.

9. The adjustable support device of claim 6
wherein the locking mechanisms each have a respective pivotal connection from respective ends of the arms to the brackets.

10. An adjustable support device for a structure, the device comprising:
an arcuate support bar terminating in feet configured to engage with a ground surface;
two spaced apart locking mechanisms pivotally connected to the structure and connecting the structure to the arcuate support bar, each locking mechanism including two spaced apart brackets positioned on opposite sides of the arcuate support bar so as to prevent angular movement of the support bar, a stop member and spaced apart upper and lower engagement rods extending between the brackets such that the arcuate support bar extends between the engagement rods;
wherein the locking mechanisms are pivotally moveable between a first position, in which the stop member prevents further pivotal movement in one direction such that the engagement rods are positioned so as to allow the arcuate support bar to slide freely over the engagement rods, and a second position, when weight is applied to the locking mechanisms, in which the engagement rods lock against the arcuate support bar so as to prevent sliding movement therethrough so as to support the structure in a required orientation; and
wherein the pivotal connection is located below the upper engagement rod when the locking mechanisms are level.

11. An adjustable support device for a structure, the device comprising:
an arcuate support bar terminating in feet configured to engage with a ground surface;
two spaced apart locking mechanisms pivotally connected to the structure and connecting the structure to the arcuate support bar, each locking mechanism including two spaced apart brackets positioned on opposite sides of the arcuate support bar so as to prevent angular movement of the support bar, a stop member and spaced apart upper and lower engagement rods extending between the brackets such that the arcuate support bar extends between the engagement rods;
wherein the locking mechanisms are pivotally moveable between a first position, in which the stop member prevents further pivotal movement in one direction such that the engagement rods are positioned so as to allow the arcuate support bar to slide freely over the engagement rods, and a second position, when weight is applied to the locking mechanisms, in which the engagement rods lock against the arcuate support bar so as to prevent sliding movement therethrough so as to support the structure in a required orientation;
wherein the brackets are shaped substantially like a parallelogram, having four sides and four corners and
wherein the upper and lower engagement rods are located at adjacent upper and lower corners respectively, the stop member being located at the other upper corner and the pivotal connection being located at the other lower corner.

12. The adjustable support device of claim 11, wherein the brackets have depending arms that extend between the brackets to the lower corner where the pivotal connection is located, and the stop member thus abuts against the depending arm so as to limit the pivotal movement of the locking mechanism.

13. An adjustable support device, the device comprising:
a frame for attachment to a structure to be levelled;
an arcuate support bar terminating in feet configured to engage with a ground surface;
two spaced apart locking mechanisms connecting the frame to the arcuate support bar, each locking mechanism including two spaced apart brackets positioned on either side of the arcuate support bar so as to prevent angular movement of the support bar, a stop member and spaced apart upper and lower engagement members extending between the bracket whereby the arcuate support bar extends between the engagement members;
wherein the locking mechanisms each have respective pivotal connections to the frame and are pivotally moveable between a first position, in which the stop member prevents further pivotal movement in one direction such that the engagement members are positioned so as to allow the arcuate support bar to slide freely over the engagement members to locate the feet in engagement with the ground surface, and a second position, when weight is applied to the frame, in which the engagement members lock against the arcuate support bar so as to prevent sliding movement therethrough so as to support the structure in a levelled orientation; and
wherein, in the first position, the pivotal connection of each locking mechanism to the frame is above a horizontal level of the lower engagement member and, in the second position, the pivotal connection is substantially horizontally aligned with or below the lower engagement member; and
wherein the upper and lower engagement members and the pivotal connection of each of the locking mechanisms to the frame define an apex of a triangle.

14. The adjustable support device of claim 13 wherein the engagement members comprise rods extending between the brackets.

15. The adjustable support device of claim 13 wherein the triangle so defined is an isosceles triangle with equal side lengths from the upper engagement member to the lower engagement member and from the upper engagement member to the pivotal connection.

16. A wheelbarrow comprising:

a chassis including a front wheel supporting a barrow;

an arcuate support bar terminating in feet configured to engage with a ground surface;

two spaced apart locking mechanisms connecting the chassis or barrow to the arcuate support bar, each locking mechanism including upper and lower engagement members on upper and lower sides of the arcuate support bar, whereby the arcuate support bar extends between the engagement members;

wherein the locking mechanisms are pivotally mounted and pivotally moveable between a first position, such that the engagement members are positioned so as to allow the arcuate support bar to slide freely over the engagement members, and a second position, when weight is applied to locking mechanisms through their connection to the frame or barrow, in which the engagement members lock against the arcuate support bar so as to prevent sliding movement therethrough so as to support the wheelbarrow in a levelled or a tilted orientation.

17. The wheelbarrow of claim 16 wherein each locking mechanism includes a stop member, which maintains the locking mechanism in the first position when the frame is lifted away from the arcuate support bar.

18. The wheelbarrow of claim 16 wherein the feet are substantially semi-spherical in shape.

19. The wheelbarrow of claim 16 wherein in the first position, the pivotal mounting of the locking mechanisms is above the horizontal level of the lower engagement member and, in the second position, the pivotal mounting is substantially horizontally aligned with or below the lower engagement member.

* * * * *